US008744352B2

(12) United States Patent
Pochop, Jr.

(10) Patent No.: US 8,744,352 B2
(45) Date of Patent: Jun. 3, 2014

(54) AUTOMATIC ACCESS POINT LOCATION, PLANNING, AND COVERAGE OPTIMIZATION

(75) Inventor: Jeffrey L Pochop, Jr., Los Gatos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 261 days.

(21) Appl. No.: 12/951,458

(22) Filed: Nov. 22, 2010

(65) Prior Publication Data

US 2012/0129559 A1 May 24, 2012

(51) Int. Cl.
*H04B 7/00* (2006.01)
*H04W 4/02* (2009.01)

(52) U.S. Cl.
CPC .................... *H04W 4/025* (2013.01)
USPC ..... 455/41.2; 455/41.1; 455/41.3; 455/456.1; 455/457; 455/522; 709/223; 709/224; 709/225; 709/226

(58) Field of Classification Search
USPC .......... 703/223–226; 455/41.1–41.3, 455/456.1–457, 522, 69–70; 709/223–226
See application file for complete search history.

(56) References Cited

U.S. PATENT DOCUMENTS 7,295,119 B2 * 11/2007 Rappaport et al. ......... 340/572.4
7,567,822 B2 * 7/2009 Hart et al. .................. 455/562.1
7,664,511 B2 * 2/2010 Wang et al. ................. 455/456.1
2004/0054767 A1 * 3/2004 Karaoguz et al. ............. 709/223
2005/0059405 A1 3/2005 Thomson et al.
2007/0025287 A1 * 2/2007 Goren et al. .................. 370/328
2007/0082677 A1 * 4/2007 Donald Hart et al. ...... 455/456.1
2010/0022263 A1 * 1/2010 Stamoulis et al. ............. 455/501
2010/0208711 A1 8/2010 Georgis et al.
2012/0289248 A1 * 11/2012 Stamoulis et al. ......... 455/456.1
2012/0290720 A1 * 11/2012 Stamoulis et al. ............ 709/224

FOREIGN PATENT DOCUMENTS

| CN | 101726725 A | 6/2010 |
|---|---|---|
| EP | 2 056 532 | 5/2009 |
| WO | WO 2010/100325 | 9/2010 |

OTHER PUBLICATIONS

European Search Report corresponding to EP 11 16 7002 mailed Mar. 12, 2012, 6 pages.

* cited by examiner

*Primary Examiner* — Fayyaz Alam
(74) *Attorney, Agent, or Firm* — Harrity & Harrity, LLP

(57) ABSTRACT

A device receives distances between an access point, located on a floor of a building, and other access points located on the same floor, and determines, based on the distances, relative location information associated with the access point, where the relative location information provides a location of the access point relative to the other access points. The device also determines, using a triangulation method, an actual location of the access point based on the relative location information. The device further maps the actual location of the access point to a floor plan of the floor, and displays the floor plan with the mapped actual location of the access point.

20 Claims, 12 Drawing Sheets

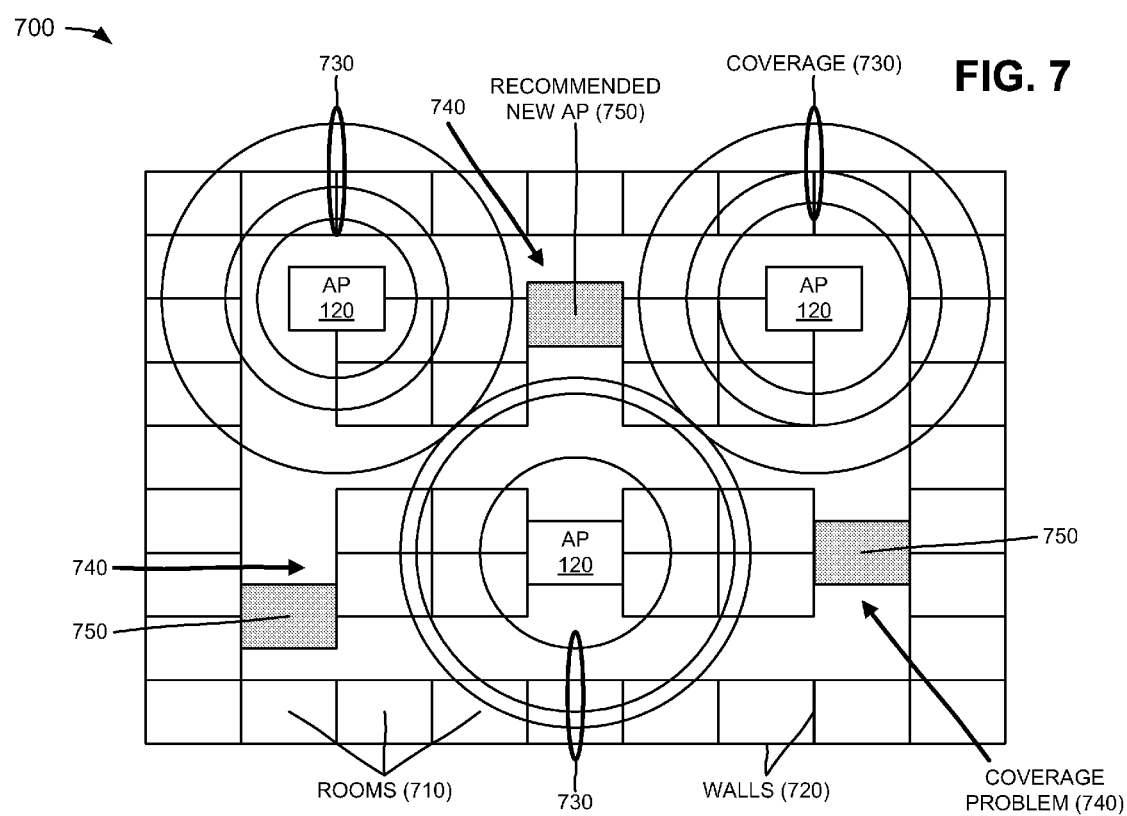

AUTOMATIC ACCESS POINT LOCATION, PLANNING, AND COVERAGE OPTIMIZATION

BACKGROUND

A wireless access point (or access point) is a device that allows wired communication devices (e.g., network devices, such as routers, firewalls, switches, or gateways, which transfer or switch data, such as packets) to connect to a wireless network (e.g., a wireless local area network (WLAN)) using wireless technologies (e.g., Wi-Fi, Bluetooth, or related standards). The access point may connect to a network device (e.g., connected to a network), and may relay data between wireless devices (e.g., client devices, such as personal computers, laptop computers, printers, smart phones, etc.) and the network device. In one example, an access point may include a wireless network device, such as a wireless router.

A typical corporate use of access points involves attaching several access points to a wired network (e.g., a corporate intranet that includes one or more network devices) and providing wireless access to client devices located, for example, in a building. The access points may form a WLAN for the client devices, and may be managed by a WLAN controller. The WLAN controller may handle automatic adjustments to radio frequency (RF) power, channels, authentication, and/or security associated with the access points.

The typical access point location and coverage modeling process requires a network administrator to manually select access point locations, such as by using blueprints or other drawings of a facility. These locations may be used for RF coverage optimization (e.g., channels and power level selection) of the access points and for WLAN location-based services (e.g., client device tracking). The process requires the network administrator to import facility floor plans, and to either manually select potential access point locations or manually specify facility RF characteristics (e.g., RF characteristics of walls, ceilings, and other obstructions). However, this manual process is prone to human errors, such as assigning incorrect access point identifications (IDs) to locations, locating access points at incorrect locations, improperly orienting directional antennas of access points, not inputting access point locations, etc.

SUMMARY

According to one aspect, a method may include receiving, by the computing device, distances between an access point, located on a floor of a building, and other access points located on the same floor; and determining, by the computing device and based on the distances, relative location information associated with the access point, where the relative location information provides a location of the access point relative to the other access points. The method may also include determining, by the computing device and using a triangulation method, an actual location of the access point based on the relative location information; and mapping, by the computing device, the actual location of the access point to a floor plan of the floor. The method may further include providing, by the computing device and for display, the floor plan with the mapped actual location of the access point.

According to another aspect, a device may include a memory to store a plurality of instructions, and a processor to execute instructions in the memory to: receive distances between an access point, located on a floor of a building, and other access points located on the same floor, and determine, based on the distances, relative location information associated with the access point, where the relative location information provides a location of the access point relative to the other access points. The processor may also execute instructions in the memory to determine, using a triangulation method or a trilateration method, an actual location of the access point based on the relative location information, map the actual location of the access point to a floor plan of the floor, and provide, for display, the floor plan with the mapped actual location of the access point.

According to still another aspect, one or more computer-readable media may store instructions executable by one or more processors. The media may store one or more instructions for: receiving distances between an access point, located on a level of a building, and other access points located on the same level; determining, based on the distances, relative location information associated with the access point, where the relative location information provides a location of the access point relative to the other access points; determining, using a triangulation method or a trilateration method, an actual location of the access point based on the relative location information; mapping the actual location of the access point to a floor plan of the level; providing, for display, the floor plan with the mapped actual location of the access point; and providing, for display, one or more performance optimization recommendations with the floor plan and the mapped actual location of the access point.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 6 and 7 are diagrams of example user interfaces capable of being provided by the planning tool of FIG. 5.

DETAILED DESCRIPTION

Figure 1:
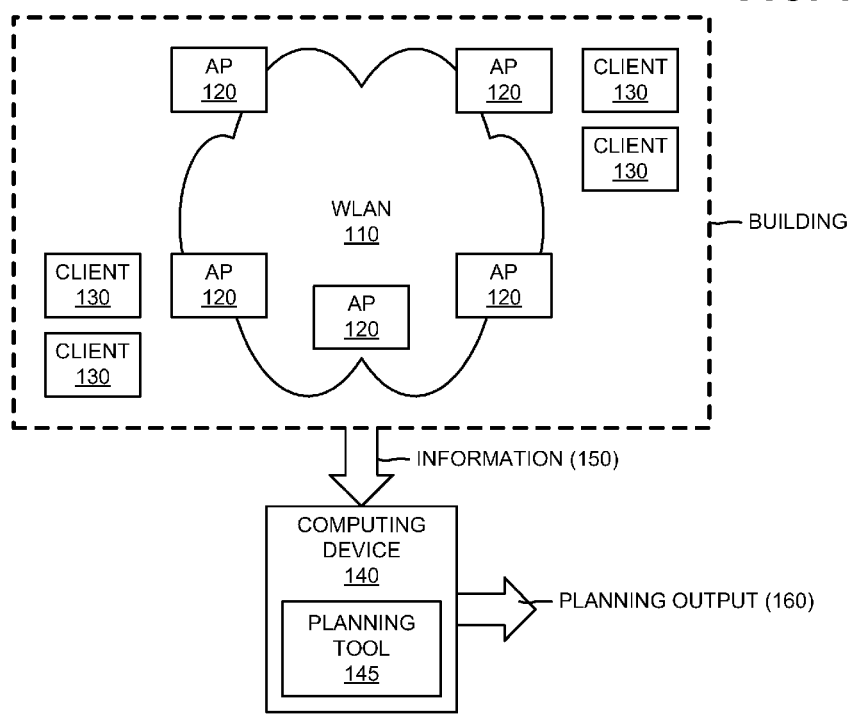
FIG. 1 is a diagram of an example network in which systems and/or methods described herein may be implemented.

The following detailed description refers to the accompanying drawings. The same reference numbers in different drawings may identify the same or similar elements. Also, the following detailed description does not limit the invention.

Systems and/or methods described herein may utilize RF discovery to automatically determine locations of access points (e.g., in a WLAN) relative to other access points in the WLAN. The systems and/or methods may also utilize RF discovery to resolve access points into groups (e.g., access points residing on the same floor of a building). The systems and/or methods may provide the relative location information, relating to the access points, to a planning tool, and the planning tool may utilize the relative location information to determine the actual locations of the access points. The planning tool may map the actual locations of the access points to a floor plan (e.g., of a building), and may utilize the floor plan with the mapped actual locations of the access points to provide performance optimization recommendations for the WLAN.

The systems and/or methods may provide a simple and adaptive mechanism for planning and implementing access points in a WLAN, and may provide improved WLAN performance through adaptive planning operations. The systems and/or methods may also eliminate the human errors (e.g., assigning incorrect access point IDs, locating an access point at an incorrect location, improperly orienting a directional antenna of an access point, not inputting access point locations, etc.) associated with the typical access point location and coverage modeling process.

In an example implementation, the systems and/or methods may determine location information of access points, located on a floor (or level) of a building, relative to other access points located on the floor, and may receive location information of client devices associated with the access points. The systems and/or methods may receive location information associated with different access points located on a different floor (or level) of the building, and may determine, using triangulation, the actual locations of the access points based on the relative location information of the access points. The systems and/or methods may adjust, if necessary, the actual locations of the access points based on the location information of the clients and/or the location information of the different floor access points. The systems and/or methods may map the actual locations of the access points to a floor plan of the floor, and may display the floor plan with the mapped actual locations of the access points. The systems and/or methods may also display performance optimization recommendations for the floor plan with the mapped actual locations of the access points.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

FIG. 1 is a diagram of an example network 100 in which systems and/or methods described herein may be implemented. As illustrated, network 100 may include a WLAN 110 (e.g., that includes multiple access points (APs) 120), multiple client devices 130, and a computing device 140 (e.g., that includes a planning tool 145). As further shown in FIG. 1, WLAN 110, access points 120, and client devices 130 may be provided in a building (e.g., on a floor of a building). Computing device 140 may be provided within the building or externally to the building.

Components of network 100 may interconnect via wired and/or wireless connections or links. One WLAN 110, five access points 120, four client devices 130, one computing device 140, and one planning tool 145 have been illustrated in FIG. 1 for simplicity. In practice, there may be more WLANs 110, access points 120, client devices 130, computing devices 140, and/or planning tools 145. Also, in some instances, one or more of the components of network 100 may perform one or more tasks described as being performed by another one or more of the components of network 100.

WLAN 110 may include one or more networks of any type. For example, WLAN 110 may include a LAN, a wide area network (WAN), a metropolitan area network (MAN), an intranet, or a combination of networks. In one example implementation, WLAN 110 may include a wireless LAN that provides client devices 130 with wireless access (e.g., via access points 120) to additional networks (e.g., the Public Switched Telephone Network (PSTN), Public Land Mobile Network (PLMN), an intranet, the Internet, etc.). WLAN 110 may provide client devices 130 wireless access to the additional networks via one or more network devices (not shown), such as a gateway, a router, a switch, a firewall, a network interface card (NIC), a hub, a bridge, a proxy server, an optical add-drop multiplexer (OADM), or some other type of device that processes and/or transfers traffic.

Access point 120 may include a device that allows wired communication devices (e.g., network devices) to connect to a wireless network (e.g., WLAN 110) using wireless technologies (e.g., Wi-Fi, Bluetooth, or related standards). Access point 120 may connect to a network device, and may communicate data between wireless devices (e.g., client devices 130) and the network device. In one example, access point 120 may include a wireless network device, such as a wireless router. In one example implementation, one or more access points 120 may be arranged on one or more floors of the building in order provide client devices 130 with wireless access to additional networks (not shown) via one or more network devices (not shown).

Each of client devices 130 may include any device that is capable of accessing WLAN 110 via one or more access points 120. For example, client device 130 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device (e.g., a wireless telephone), a smart phone, a laptop computer, a personal computer, a printer, or other types of computation or communication devices.

Computing device 140 may include one or more computation or communication devices, that gather, process, and/or provide information in a manner described herein. In one example, computing device 140 may include a server device, a laptop computer, a personal computer, a workstation computer, etc. As shown in FIG. 1, computing device 140 may communicate with one or more of WLAN 110, access points 120, and client devices 130, and may receive information 150 from WLAN 110, access points 120, and/or client devices 130. Information 150 may include, for example, relative location information associated with access points 120 (e.g., relative to other access points 120), information provided by client devices 130 (e.g., regarding locations of access points 120), location information associated with access points 120 provided on other floors of the building, etc. Client device 140 may provide information 150 to planning tool 145.

Planning tool 145 may include software that, when executed by hardware components of computing device 140, enables computing device 140 to utilize information 150 to generate planning output information 160. Planning output information 160 may include actual locations of access points 120 on the floor of the building, a floor plan that includes a mapping of the actual locations of the access points 120, performance optimization recommendations for WLAN 110 and/or access points 120, etc.

In one example implementation, computing device 140 (e.g., via planning tool 145) may determine location information of access points 120 (e.g., located at a floor of the building), relative to other access points 120 located on the building floor, and may receive location information of client devices 130 associated with access points 120. Computing device 140 may receive location information associated with access points 120 located at a different floor of the building, and may determine, using triangulation, the actual locations of access points 120 based on the relative location information of access points 120. Computing device 140 may adjust, if necessary, the actual locations of access points 120 based on the location information of client devices 130 and/or the location information of the different floor access points 120. Computing device 140 may map the actual locations of access points 120 to a floor plan, and may provide, for display, the floor plan with the mapped actual locations of access points 120. Computing device 140 may also provide, for display, performance optimization recommendations for the floor plan with the mapped actual locations of access points 120.

Although FIG. 1 shows example components of network 100, in other implementations, network 100 may include fewer components, different components, differently arranged components, or additional components than depicted in FIG. 1.

Figure 2:
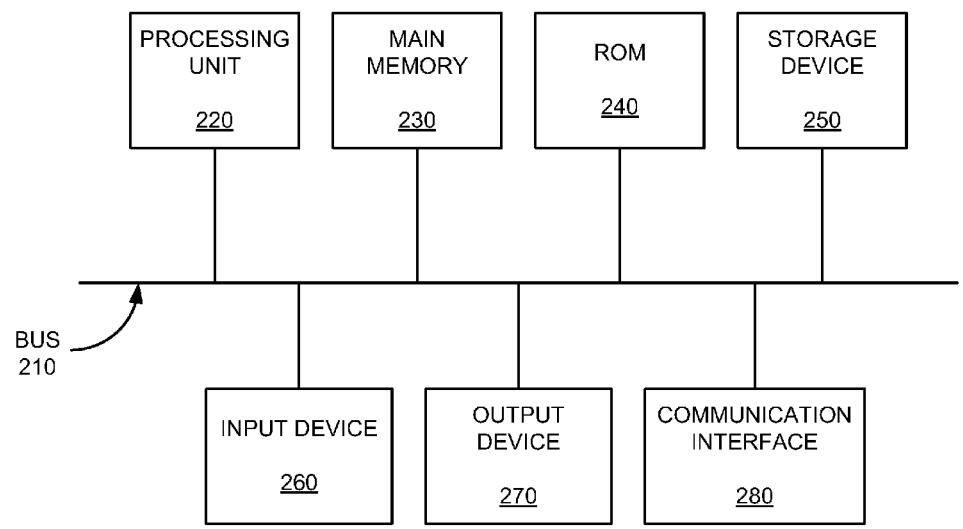
FIG. 2 is a diagram of example components of a computing device depicted in FIG. 1.

FIG. 2 illustrates a diagram of example components of a device 200 that may correspond to computing device 140 (FIG. 1). As illustrated, device 200 may include a bus 210, a processing unit 220, a main memory 230, a ROM 240, a storage device 250, an input device 260, an output device 270, and/or a communication interface 280. Bus 210 may include a path that permits communication among the components of device 200.

Processing unit 220 may include one or more processors, microprocessors, ASICs, FPGAs, or other types of processing units that may interpret and execute instructions. Main memory 230 may include a RAM or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, a touch screen, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions (e.g., planning tool 145) contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
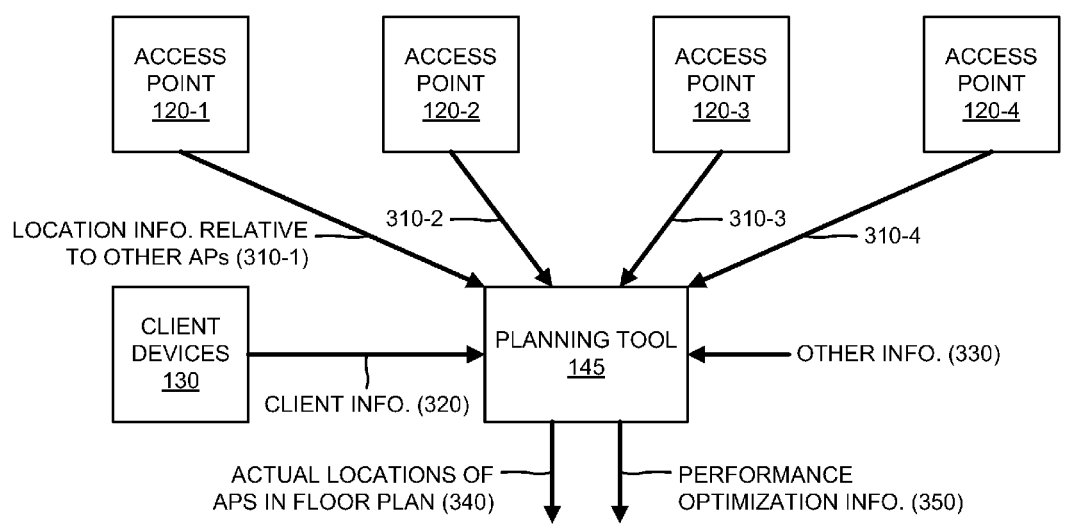
FIG. 3 is a diagram of example interactions between components of an example portion of the network depicted in FIG. 1.

FIG. 3 is a diagram of example interactions between components of an example portion 300 of network 100. As illustrated, example network portion 300 may include access points 120, client devices 130, and planning tool 145. Access points 120, client devices 130, and planning tool 145 may include the features described above in connection with, for example, one or more of FIGS. 1 and 2.

As further shown in FIG. 3, the four access points 120 may be labeled 120-1, 120-2, 120-3, and 120-4 for ease of explanation. It may be assumed that access points 120-1 through 120-4 are located on the same floor of a building. Access point 120-1 may provide (e.g., based on RF information associated with access point 120-1) location information 310-1 to planning tool 145. Location information 310-1 may include an estimated location of access point 120-1 relative to other access points 120-2, 120-3, and 120-4. Access point 120-2 may provide (e.g., based on RF information associated with access point 120-2) location information 310-2 to planning tool 145. Location information 310-2 may include an estimated location of access point 120-2 relative to other access points 120-1, 120-3, and 120-4. Access point 120-3 may provide (e.g., based on RF information associated with access point 120-3) location information 310-3 to planning tool 145. Location information 310-3 may include an estimated location of access point 120-3 relative to other access points 120-1, 120-2, and 120-4. Access point 120-4 may provide (e.g., based on RF information associated with access point 120-4) location information 310-4 to planning tool 145. Location information 310-4 may include an estimated location of access point 120-4 relative to other access points 120-1, 120-2, and 120-3. Location information 310-1, 310-2, 310-3, 310-4 may be collectively referred to herein as location information 310.

Client devices 130 may provide client information 320 to planning tool 145. Client information 320 may include RF information (e.g., strength of RF signals provided by access points 120 to client devices 130) of client devices 130 that may be used to determine actual locations of access points 120. For example, client information 320 may include estimated locations of client devices 130 relative to access points 120. Client devices 130 may be located on the same floor as access points 120 or may be located on different floor(s) than access points 120.

As further shown in FIG. 3, planning tool 145 may receive other information 330 that may be used to determine actual locations of access points 120. Other information 330 may include location information (e.g., RF information) associated with access points 120 provided on different floor(s) than access points 120-1 through 120-4. The RF information of the different floor access points 120 may provide estimated locations of the different floor access points 120 relative to one or more of access points 120-1 through 120-4. The RF information of the different floor access points 120 may also enable the different floor access points 120 to be resolved into groups based on an estimated number of floors in the building, base on floor and/or ceiling attenuation values, etc. Other information 330 may also include information provided by wired port virtual LAN (VLAN), traceroute, and other network topology discovery protocols, which may be used to resolve access points 120-1 through 120-4 into a same floor group. Other information 330 may further include information provided by two-dimensional and three-dimensional antenna patterns of access points 120-1 through 120-4, and information provided by embedded accelerometers provided in access points 120-1 through 120-4.

Planning tool 145 may receive location information 310, client information 320, and other information 330, and may determine actual locations 340 of access points 120-1 through 120-4 (e.g., at the floor of the building) based on location information 310. In one example implementation, planning tool 145 may utilize a triangulation method (e.g., similar to a global positioning satellite (GPS) triangulation method) to determine actual locations 340 of access points 120-1 through 120-4 based on location information 310. Additionally, planning tool 145 may modify or adjust (if necessary) the determined actual locations 340 of access points 120-1 through 120-4 based on client information 320 and/or based on other information 330 (e.g., the location information of the different floor access points 120). Planning tool 145 may map the determined actual locations 340 of access points 120-1 through 120-4 on a floor plan (e.g., of the floor where access points 120-1 through 120-4 are located), and may provide, for display, the floor plan with the mapped actual locations 340 of access points 120-1 through 120-4.

As further shown in FIG. 3, planning tool 145 may determine performance optimization information 350 based on one or more of location information 310, client information 320, and other information 330. Performance optimization information 350 may include, for example: providing recommendations that a user of computing device 140 rotate, scale, and reposition access points 120-1 through 120-4 in planning tool 145 relative to the floor plan; using actual locations 340 of access points 120-1 through 120-4 to recommend adding, moving, and/or removing access points 120 to optimize coverage and performance; using actual locations 340 of access points 120-1 through 120-4 for visualization-based connection, coverage, and throughput monitoring, debugging, and optimization; using actual locations 340 of access points 120-1 through 120-4 to automatically assign attenuation values to floor plan obstructions (e.g., walls, cubes, ceilings, ducts, doors, etc.); etc. Planning tool 145 may provide, for display, performance optimization information 350 with the floor plan and the mapped actual locations 340 of access points 120-1 through 120-4.

In one example scenario, access points 120-1 through 120-4 may be provided in a building according to a combination of best practices (e.g., install an access point 120 every twenty (20) feet on the ceiling) and available mounting locations for access points 120-1 through 120-4. Planning tool 145 may receive location information 310, client information 320, and other information 330, and may determine actual locations 340 of access points 120-1 through 120-4 based on location information 310, client information 320, and/or other information 330. Such an arrangement may enable the exact locations of access points 120 (e.g., on a floor of a building) to be determined, and may enable floor plans with the mapped access point locations to be generated without knowledge of access point IDs (e.g., serial numbers).

Although FIG. 3 shows example components of network portion 300, in other implementations, network portion 300 may include fewer components, different components, differently arranged components, or additional components than depicted in FIG. 3. Alternatively, or additionally, one or more components of network portion 300 may perform one or more other tasks described as being performed by one or more other components of network portion 300.

Figure 4A:
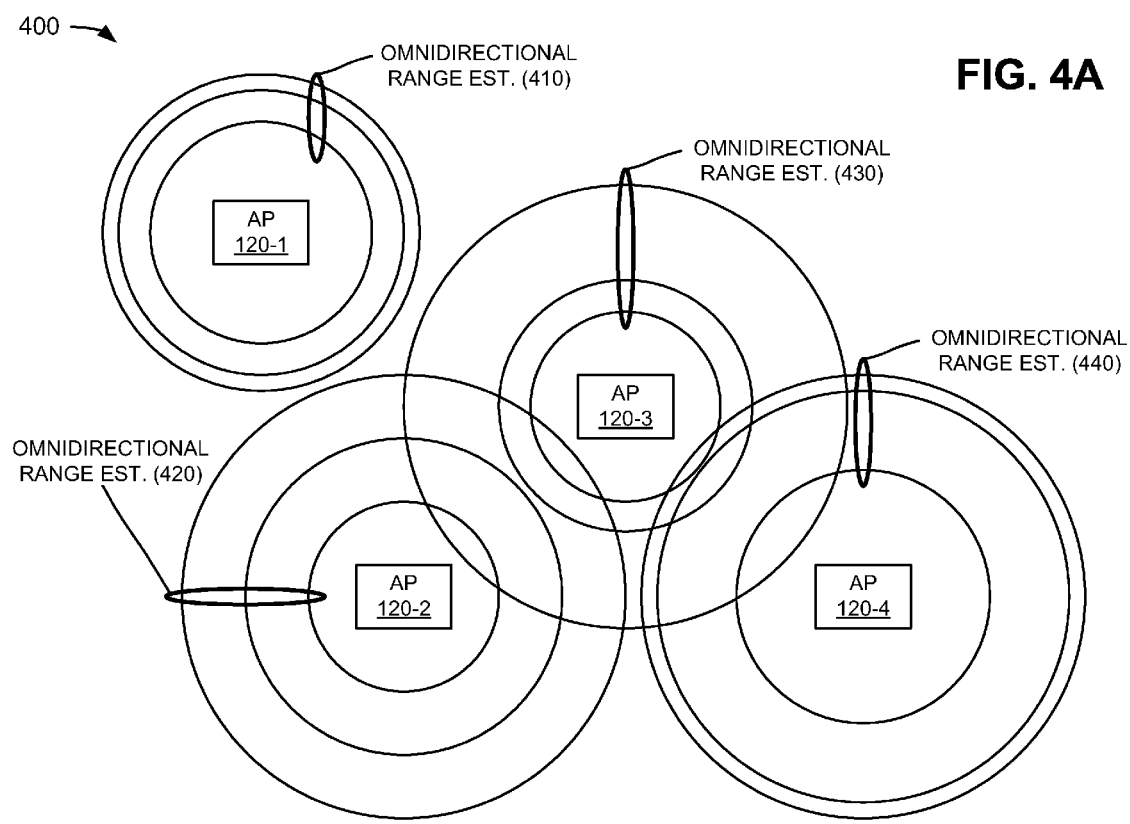
FIGS. 4A-4C are diagrams of example RF patterns capable of being generated by access points depicted in FIG. 1.
Figure 4B:
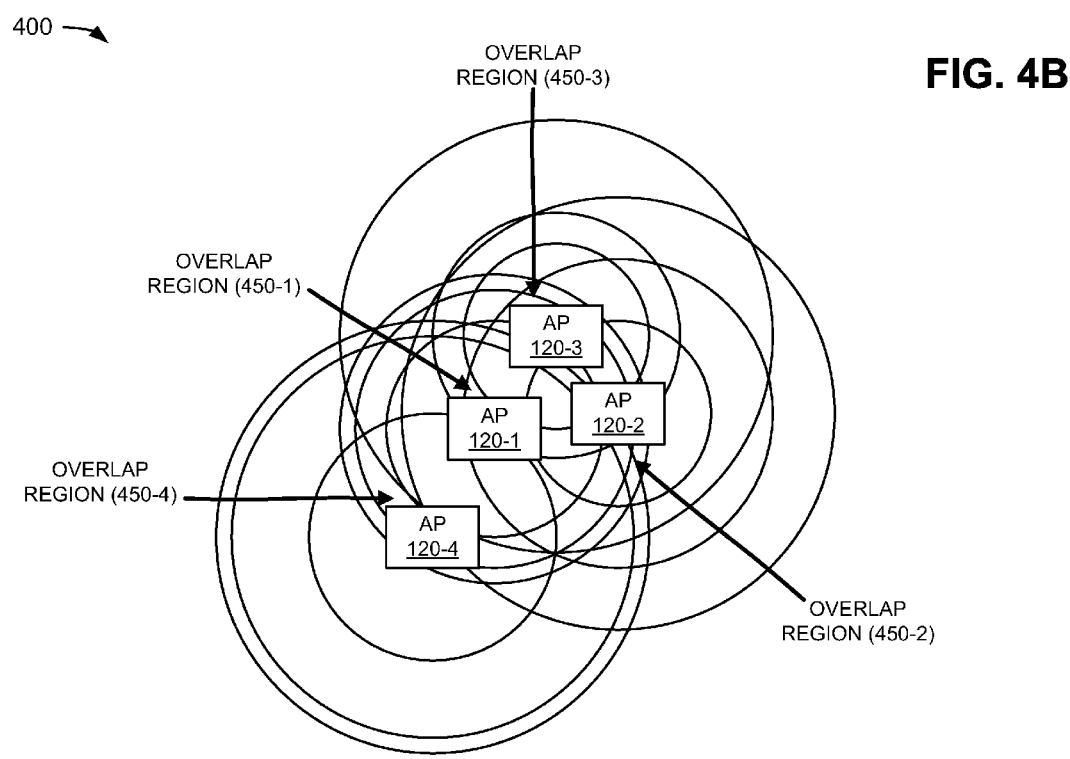
Figure 4C:
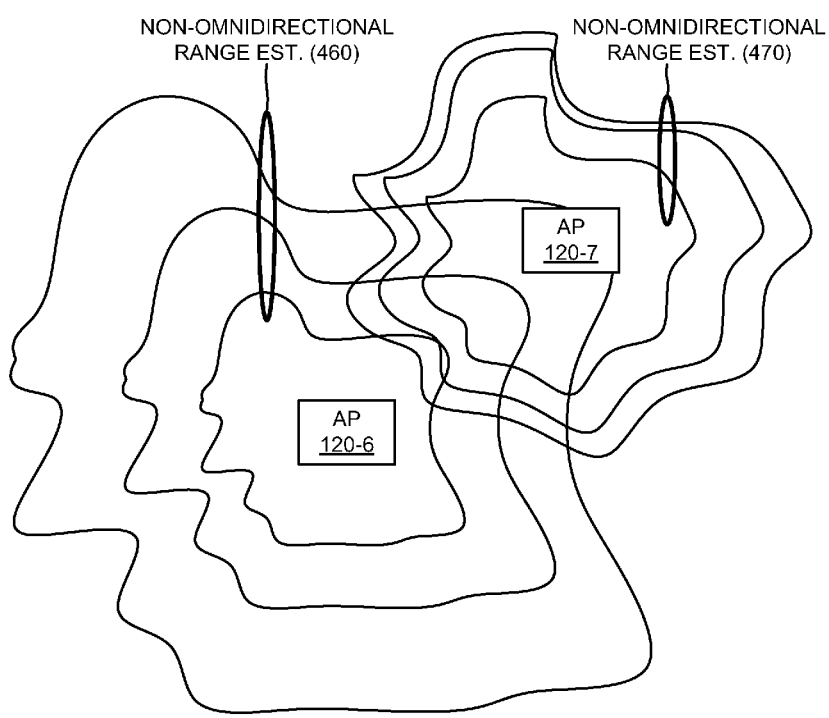

FIGS. 4A-4C are diagrams of example RF patterns 400 capable of being generated by access points 120. Access points 120 may include the features described above in connection with, for example, one or more of FIGS. 1-3. The four access points 120 depicted in FIGS. 4A and 4B may be labeled 120-1, 120-2, 120-3, and 120-4 for ease of explanation. It may be assumed that access points 120-1 through 120-4 are located on the same floor of a building. The two access points 120 depicted in FIG. 4C may be labeled 120-6 and 120-7 for ease of explanation. It may be assumed that access points 120-6 and 120-7 are located on the same floor of a building.

As shown in FIG. 4A, each of access points 120-1 through 120-4 may calculate omnidirectional range estimates to other access points 120 based on the strengths of RF signals received from the other access points 120. For example, access point 120-1 may calculate an omnidirectional range estimate 410 to access points 120-2, 120-3, and 120-4 based on the strengths of RF signals received from access points 120-2, 120-3, and 120-4. Access point 120-2 may calculate an omnidirectional range estimate 420 to access points 120-1, 120-3, and 120-4 based on the strengths of RF signals received from access points 120-1, 120-3, and 120-4. Access point 120-3 may calculate an omnidirectional range estimate 430 to access points 120-1, 120-2, and 120-4 based on the strengths of RF signals received from access points 120-1, 120-2, and 120-4. Access point 120-4 may calculate an omnidirectional range estimate 440 to access points 120-1, 120-2, and 120-3 based on the strengths of RF signals received from access points 120-1, 120-2, and 120-3.

Access points 120-1, 120-2, 120-3, and 120-4 may provide omnidirectional range estimates 410, 420, 430, and 440, respectively, to computing device 140 (e.g., to planning tool 145). In one example implementation, omnidirectional range estimates 410, 420, 430, and 440 may correspond to location information 310-1, 310-2, 310-3, and 310-4 (FIG. 3), respectively. Planning tool 145 may utilize a triangulation method (e.g., similar to a GPS triangulation method) to determine actual locations 340 of access points 120-1 through 120-4 based on omnidirectional range estimates 410-440. In the triangulation method, for example, an actual location of access point 120-1 may be calculated from distance measurements (e.g., omnidirectional range estimate 410) to access points 120-2, 120-3, and 120-4. Mathematically, a minimum of four access points 120 (e.g., four omnidirectional range estimates) may be needed to determine the exact position of an access point 120, and an actual location of at least one access point 120 (e.g., relative to the building) may need to be known. However, with additional information (e.g., client information 320 and/or other information 330), less than four access points 120 (e.g., four omnidirectional range estimates) may be needed to determine the exact position of an access point 120. In other implementations, the triangular method may be replaced with other methods, such as a trilateration method used in GPS.

Planning tool 145 may utilize the triangulation method (or the trilateration method) to solve for overlap of omnidirectional range estimates 410-440, which may be used to determine actual locations of access points 120-1 through 120-4. For example, as shown in FIG. 4B, the triangulation method may determine an overlap region 450-1 (e.g., which may correspond to the actual location of access point 120-1), an overlap region 450-2 (e.g., which may correspond to the actual location of access point 120-2), an overlap region 450-3 (e.g., which may correspond to the actual location of access point 120-3), and an overlap region 450-4 (e.g., which may correspond to the actual location of access point 120-4).

Planning tool 145 may utilize additional information (e.g., client information 320 and/or other information 330) to modify or adjust the determined actual locations of access points 120-1 through 120-4.

As shown in FIG. 4C, access points 120 may generate non-omnidirectional antenna patterns. For example, access point 120-6 may calculate a non-omnidirectional range estimate 460 to access point 120-7 based on the strengths of RF signals received from access points 120-7. Access point 120-7 may calculate a non-omnidirectional range estimate 470 to access point 120-6 based on the strengths of RF signals received from access points 120-6. In such a situation, computing device 140 (e.g., planning tool 145) may utilize non-omnidirectional range estimates 460 and 470 to assist in determining locations of access points 120-6 and 120-7 relative to each other. Computing device 140 (e.g., planning tool 145) may need to rely more heavily on other information (e.g., client information 320 and/or other information 330) to determine the actual locations of access points 120-6 and 120-7.

Although FIGS. 4A-4C show example RF patterns 400 capable of being generated by access points 120, in other implementations, access points 120 may generate different RF patterns, differently arranged RF patterns, or additional RF patterns than depicted in FIGS. 4A-4C.

Figure 5:
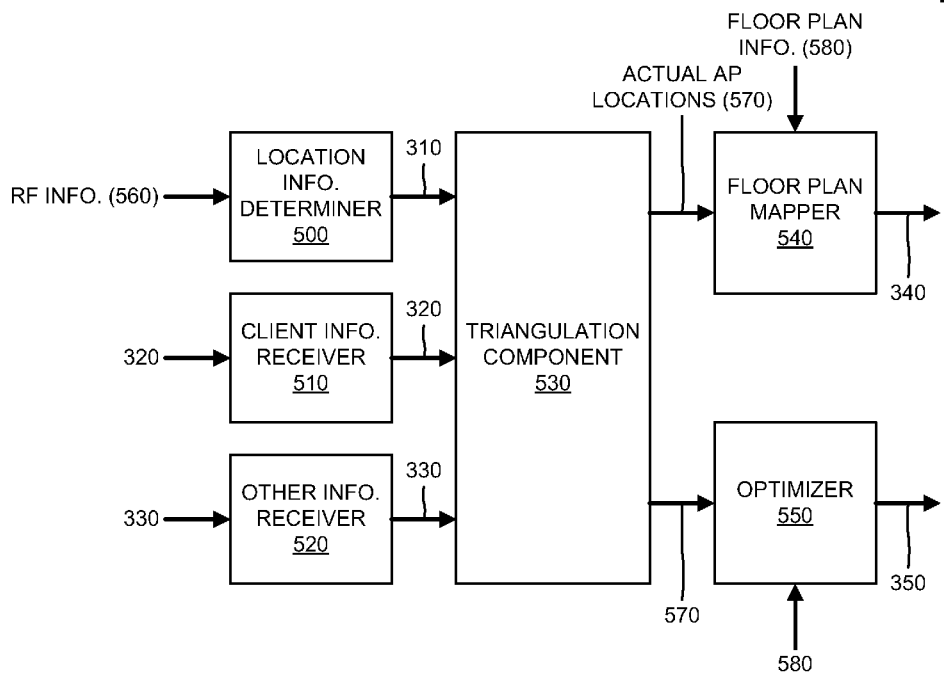
FIG. 5 is a diagram of example functional components of a planning tool of the computing device illustrated in FIG. 1.

FIG. 5 is a diagram of example functional components of planning tool 145 of computing device 140. In one implementation, the functions described in connection with FIG. 5 may be performed by one or more components of device 200 (FIG. 2). As illustrated in FIG. 5, planning tool 145 may include a location information determiner 500, a client information receiver 510, an other information receiver 520, a triangulation component 530, a floor plan mapper 540, and an optimizer 550.

Location information determiner 500 may include hardware or a combination of hardware and software that may receive RF information 560 from access points 120. RF information 560 may include signal strength information associated with neighboring access points 120. In one example, location information determiner 500 may convert RF information 560 into distance information between access points 120, and may calculate location information 310 for each access point 120 based on the calculated distance information. Location information determiner 500 may provide location information 310 to triangulation component 530.

Client information receiver 510 may include hardware or a combination of hardware and software that may receive client information 320 from one or more client devices 130. As further shown in FIG. 5, client information receiver 510 may provide client information 320 to triangulation component 530.

Other information receiver 520 may include hardware or a combination of hardware and software that may receive other information 330. For example, other information receiver 520 may receive other information 330 from access points 120 located on different floors, network topology discovery protocols, from two-dimensional and three-dimensional antenna patterns of access points 120-1 through 120-4, accelerometers provided in access points 120-1 through 120-4, etc. As further shown in FIG. 5, other information receiver 520 may provide other information 330 to triangulation component 530.

Triangulation component 530 may include hardware or a combination of hardware and software that may receive location information 310 from location information determiner 500, client information 320 from client information receiver 510, and other information 330 from other information receiver 520. Triangulation component 530 may utilize a triangulation method (e.g., similar to a GPS triangulation method) to determine actual locations 570 of access points 120 (e.g., relative to the building) based on location information 310. In the triangulation method, for example, an actual location of an access point 120 may be calculated from distance measurements (e.g., omnidirectional range estimates) to other access points 120. Mathematically, a minimum of four access points 120 (e.g., four omnidirectional range estimates) may be needed by triangulation component 530 to determine the exact position of an access point 120. However, with additional information (e.g., client information 320 and/or other information 330), less than four access points 120 (e.g., four omnidirectional range estimates) may be needed by triangulation component 530 to determine the exact position of an access point 120. In other implementations, triangulation component 530 may utilize other methods to determine actual locations 570, such as a trilateration method used in GPS. As further shown in FIG. 5, triangulation component 530 may provide actual locations 570 to floor plan mapper 540 and to optimizer 550.

Floor plan mapper 540 may include hardware or a combination of hardware and software that may receive actual locations 570 from triangulation component 530, and may receive floor plan information 580 (e.g., from main memory 230, ROM 240, and/or storage device 250). Floor plan information 580 may include a floor plan of the floor where access points 120 are located. Floor plan mapper 540 may map actual locations 570 of access points 120 on the floor plan, and may provide, for display, the floor plan with the mapped actual locations of access points 120, as indicated by reference number 340.

Optimizer 550 may include hardware or a combination of hardware and software that may receive actual locations 570 from triangulation component 530, and may receive floor plan information 580 (e.g., from main memory 230, ROM 240, and/or storage device 250). Optimizer 550 may determine performance optimization information 350 based actual locations 570 and floor plan information 580. Performance optimization information 350 may include, for example: providing recommendations that a user of computing device 140 rotate, scale, and reposition access points 120 relative to the floor plan; using actual locations 570 to recommend adding, moving, and/or removing access points 120 to optimize coverage and performance; using actual locations 570 for visualization-based connection, coverage, and throughput monitoring, debugging, and optimization; using actual locations 570 to automatically assign attenuation values to floor plan obstructions (e.g., walls, cubes, ceilings, ducts, doors, etc.); etc. Optimizer 550 may provide, for display, performance optimization information 350 with the floor plan and the mapped actual locations of access points 120.

Although FIG. 5 shows example functional components of planning tool 145, in other implementations, planning tool 145 may include fewer functional components, different functional components, differently arranged functional components, or additional functional components than depicted in FIG. 5. Alternatively, or additionally, one or more functional components of planning tool 145 may perform one or more other tasks described as being performed by one or more other functional components of planning tool 145.

Figure 6:
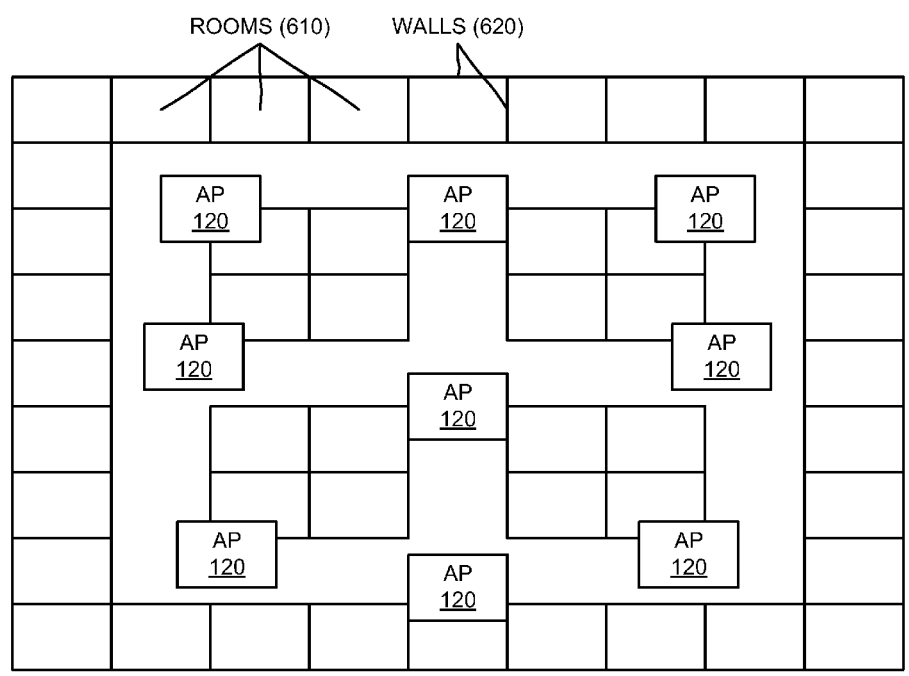

FIGS. 6 and 7 are diagrams of example user interfaces 600 and 700 capable of being provided by planning tool 145. Each of the user interfaces depicted in FIGS. 6 and 7 may include a graphical user interface (GUI) or a non-graphical user interface, such as a text-based interface. The user interfaces may provide information to users via a customized interface (e.g., a proprietary interface) and/or other types of interfaces (e.g., a browser-based interface). The user interfaces may receive user inputs via one or more input devices (e.g., input device 260), may be user-configurable (e.g., a user may change the size of the user interfaces, information displayed in the user interfaces, color schemes used by the user interfaces, positions of text, images, icons, windows, etc., in the user interfaces, etc.), and/or may not be user-configurable. The user interfaces may be displayed to a user via one or more output devices (e.g., output device 270).

As illustrated in FIG. 6, a user interface 600 may include a floor plan (e.g., of a floor of a building) that includes multiple rooms 610 defined by multiple walls 620. In one example, the floor plan may include a floor where access points 120 are located. In another example, the floor plan may correspond to a floor of an office building, and rooms 610 may correspond to offices provided on the floor of the office building.

As described above, planning tool 145 may determine actual locations of access points 120, and may map the determined actual locations of access points 120 on the floor plan. As shown in FIG. 6, access points 120 may be located at various locations of the floor plan. In one example implementation, user interface 600 may correspond to the floor plan with the mapped actual locations 340 of access points 120-1 through 120-4, as described above in connection with FIG. 3.

As illustrated in FIG. 7, a user interface 700 may include a floor plan (e.g., of a floor of a building) that includes multiple rooms 710 defined by multiple walls 720. In one example, the floor plan may include a floor where access points 120 are located. In another example, the floor plan may correspond to a floor of an office building, and rooms 710 may correspond to offices provided on the floor of the office building. As described above, planning tool 145 may determine actual locations of access points 120, and may map the determined actual locations of access points 120 on the floor plan. As shown in FIG. 7, access points 120 may be located at various locations of the floor plan.

As further shown in FIG. 7, user interface 700 may provide RF coverage 730 associated with access points 120. In one example, RF coverage 730 may not provide complete coverage for rooms 710 of the floor plan. Thus, user interface 700 may indicate coverage problems 740 associated with access points 120 (e.g., locations where access points 120 fail to provide RF coverage 730). In one example implementation, user interface 700 may provide recommendations 750 for new access points 120 in order to address coverage problems 740. In other example implementations, user interface 700 may provide other performance optimization information 350 (FIG. 3), such as providing recommendations to move or remove access points 120 to optimize coverage and performance, providing attenuation values to floor plan obstructions (e.g., walls 720, cubes, ceilings, ducts, doors, etc.), etc.

Although user interfaces 600 and 700 depict a variety of information, in other implementations, user interfaces 600 and 700 may depict less information, different information, differently arranged information, and/or additional information than depicted in FIGS. 6 and 7.

Figure 8A:
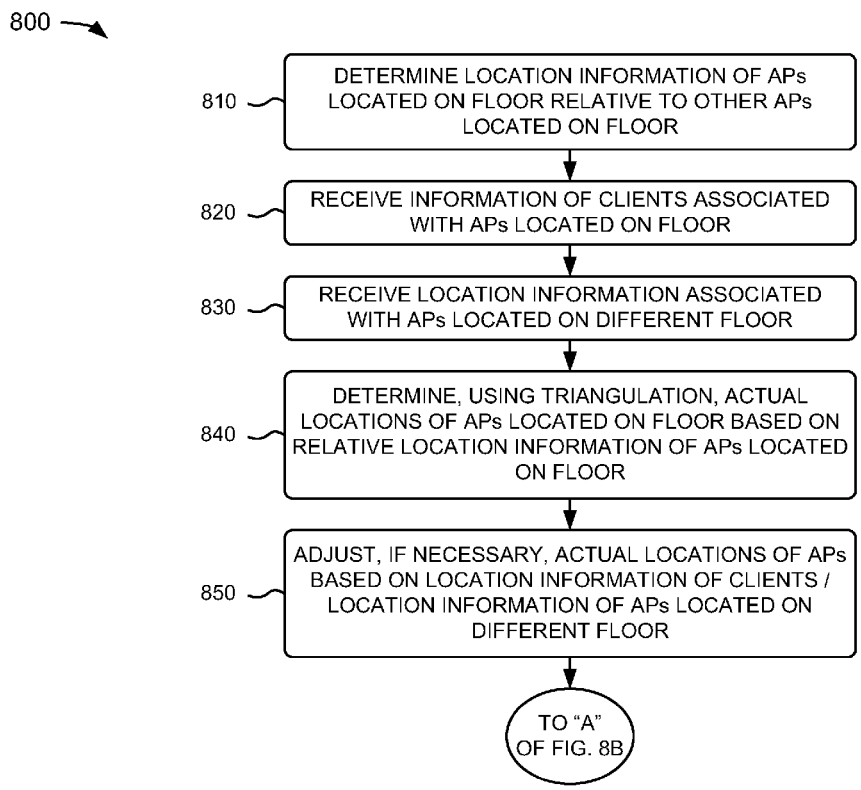
FIGS. 8A-9 are flow charts of an example process for providing automatic access point location, planning, and coverage optimization according to implementations described herein.
Figure 8B:
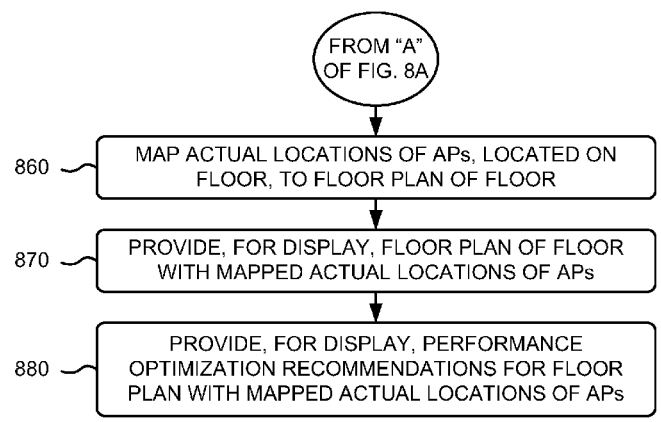
Figure 9:
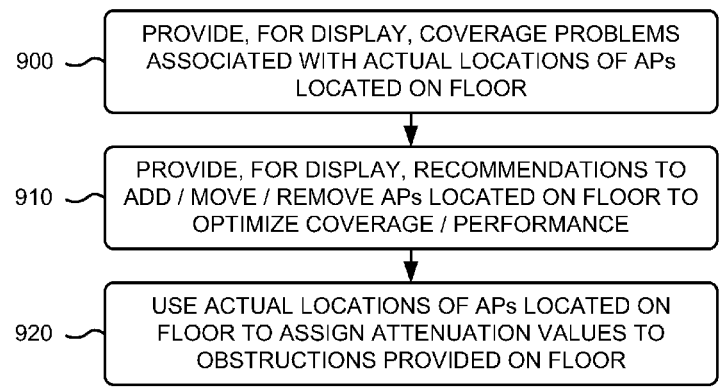

FIGS. 8A-9 are flow charts of an example process 800 for providing automatic access point location, planning, and coverage optimization according to implementations described herein. In one implementation, process 800 may be performed by computing device 140 (e.g., via planning tool 145). In another implementation, some or all of process 800 may be performed by another device in conjunction with computing device 140 (e.g., via planning tool 145).

As illustrated in FIG. 8A, process 800 may include determining location information of access points, located on a floor, relative to other access points located on the floor (block 810), and receive information of client devices associated with the access points located on the floor (block 820). For example, in implementations described above in connection with FIGS. 3 and 5, location information determiner 500 of planning tool 145 may receive RF information 560 from access points 120. RF information 560 may include signal strength information associated with neighboring access points 120. In one example, location information determiner 500 may convert RF information 560 into distance information between access points 120, and may calculate location information 310 for each access point 120 based on the calculated distance information. Client devices 130 may provide client information 320 to planning tool 145. Client information 320 may include RF information (e.g., strength of RF signals provided by access points 120 to client devices 130) of client devices 130 that may be used to determine actual locations of access points 120.

As further shown in FIG. 8A, process 800 may include receiving location information associated with access points located on a different floor (block 830), and determining, using triangulation, actual locations of the access points located on the floor based on the relative location information of the access points located on the floor (block 840). For example, in implementations described above in connection with FIG. 3, planning tool 145 may receive other information 330 that may be used to determine actual locations of access points 120. Other information 330 may include location information (e.g., RF information) associated with access points 120 provided on different floor(s) than access points 120-1 through 120-4. Other information 330 may also include information provided by wired port VLAN, traceroute, and other network topology discovery protocols, information provided by two-dimensional and three-dimensional antenna patterns of access points 120-1 through 120-4, and information provided by embedded accelerometers provided in access points 120-1 through 120-4. Planning tool 145 may receive location information 310, client information 320, and other information 330, and may determine actual locations 340 of access points 120-1 through 120-4 (e.g., on the floor of the building) based on location information 310. In one example implementation, planning tool 145 may utilize a triangulation method to determine actual locations 340 of access points 120-1 through 120-4 based on location information 310.

Returning to FIG. 8A, process 800 may include adjusting, if necessary, the actual locations of the access points based on the location information of the client devices and/or the location information of access points located on the different floor (block 850). For example, in implementations described above in connection with FIG. 3, planning tool 145 may modify or adjust (if necessary) the determined actual locations 340 of access points 120-1 through 120-4 based on client information 320 and/or based other information 330 (e.g., the location information of the different floor access points 120).

As shown in FIG. 8B, process 800 may include mapping the actual locations of the access points, located on the floor, to a floor plan of the floor (block 860), and providing, for display, the floor plan of the floor with the mapped actual locations of the access points (block 870). For example, in implementations described above in connection with FIG. 3, planning tool 145 may map the determined actual locations 340 of access points 120-1 through 120-4 on a floor plan (e.g., of the floor where access points 120-1 through 120-4 are located), and may provide, for display, the floor plan with the mapped actual locations 340 of access points 120-1 through 120-4.

As further shown in FIG. 8B, process 800 may include providing, for display, performance optimization recommendations for the floor plan with the mapped actual locations of the access points (block 880). For example, in implementations described above in connection with FIG. 3, planning tool 145 may determine performance optimization information 350 based on one or more of location information 310, client information 320, and other information 330. Planning tool 145 may provide, for display, performance optimization information 350 with the floor plan and the mapped actual locations 340 of access points 120-1 through 120-4.

Process block 880 may include the process blocks depicted in FIG. 9. As shown in FIG. 9, process block 880 may include providing, for display, coverage problems associated with the actual locations of the access points located on the floor (block 900), providing, for display recommendations to add, move, and/or remove access points located on the floor to optimize coverage and/or performance (block 910), and using the actual locations of the access points located on the floor to assign attenuation values to obstructions provided on the floor (block 920). For example, in implementations described above in connection with FIG. 3, performance optimization information 350 may include, for example: providing recommendations that a user rotate, scale, and reposition access points 120-1 through 120-4 relative to the floor plan; using actual locations 340 of access points 120-1 through 120-4 to recommend adding, moving, and/or removing access points 120 to optimize coverage and performance; using actual locations 340 of access points 120-1 through 120-4 for visualization-based connection, coverage, and throughput monitoring, debugging, and optimization; using actual locations 340 of access points 120-1 through 120-4 to automatically assign attenuation values to floor plan obstructions (e.g., walls, cubes, ceilings, ducts, doors, etc.); etc. Planning tool 145 may provide, for display, performance optimization information 350 with the floor plan and the mapped actual locations 340 of access points 120-1 through 120-4.

Systems and/or methods described herein may utilize RF discovery to automatically determine locations of access points (e.g., in a WLAN) relative to other access points in the WLAN. The systems and/or methods may also utilize RF discovery to resolve access points into groups (e.g., access points residing on the same floor of a building). The systems and/or methods may provide the relative location information to a planning tool, and the planning tool may utilize the relative location information to determine the actual locations of the access points. The planning tool may map the actual locations of the access points to a floor plan (e.g., of a building), and may utilize the floor plan with the mapped actual locations of the access points to provide performance optimization recommendations for the WLAN.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8A-9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a computing device, distances between a particular access point, of a plurality of access points located on a floor of a building, and other access points of the plurality of access points;
   determining, by the computing device and based on the distances, relative location information associated with the particular access point,
      the relative location information providing a location of the particular access point relative to the other access points;
   determining, by the computing device and using a triangulation method, an actual location on the floor of the particular access point based on the relative location information;
   mapping, by the computing device, the actual location on the floor of the particular access point on a floor plan of the floor;
   providing, by the computing device and for display, the floor plan after mapping the actual location on the floor of the particular access point; and
   providing, by the computing device and based on the actual location on the floor of the particular access point, a recommendation to move the particular access point from the actual location on the floor to another location on the floor.

2. The method of claim 1, further comprising:
   providing, for display, one or more performance recommendations with the floor plan,
      the one or more performance recommendations including one or more recommendations to rotate one or more of the plurality of access points.

3. The method of claim 1, further comprising:
   determining additional relative location information associated with the other access points;
   determining, using the triangulation method, actual locations on the floor of the other access points based on the additional relative location information;
   mapping the actual locations on the floor of the other access points on the floor plan; and
   providing, for display, the floor plan after mapping the actual locations on the floor of the other access points.

4. The method of claim 3, where providing the recommendation includes:

providing, for display, coverage problems associated with the actual location on the floor of the particular access point and the actual locations on the floor of the other access points; and providing, for display and based on the coverage problems, the recommendation to move the particular access point from the actual location on the floor to the other location on the floor.

5. The method of claim 1, further comprising:
providing, for display, another recommendation to remove one or more of the other access points from the floor.

6. The method of claim 1, further comprising:
using the actual location on the floor of the particular access point to assign attenuation values to obstructions provided on the floor; and
providing information based on the attenuation values.

7. The method of claim 1, further comprising:
receiving client information from one or more client devices associated with the particular access point;
receiving location information associated with one or more access points located on a different floor of the building; and
adjusting information identifying the actual location on the floor of the particular access point based on at least one of the client information or the location information associated with the one or more access points located on the different floor.

8. The method of claim 1, where the relative location information includes omnidirectional range estimates that are based on strengths of radio frequency signals received from the other access points.

9. The method of claim 1, where the triangulation method includes a global positioning satellite (GPS) triangulation method.

10. The method of claim 1, where the plurality of access points form a wireless local area network (WLAN).

11. A device comprising:
a memory to store a plurality of instructions; and
a processor to execute one or more of the plurality of instructions to:
determine distances between a particular access point, of a plurality of access points located on a floor of a building, and other access points of the plurality of access points,
determine, based on the distances, relative location information associated with the particular access point,
the relative location information providing a location of the particular access point relative to the other access points,
determine, using a triangulation method or a trilateration method, an actual location on the floor of the particular access point based on the relative location information,
map the actual location on the floor of the particular access point on a floor plan of the floor,
provide, for display, the floor plan after mapping the actual location on the floor of the particular access point, and
provide, based on the actual location of the particular access point, a recommendation to move the particular access point from the actual location on the floor to another location on the floor.

12. The device of claim 11, where the processor is further to:
provide, for display, one or more performance recommendations with the floor plan,
the one or more performance recommendations including one or more recommendations to use the actual location on the floor of the particular access point for monitoring or debugging of one or more of the plurality of access points.

13. The device of claim 11, where the processor is further to:
determine additional relative location information associated with the other access points,
determine, using the triangulation method or the trilateration method, actual locations on the floor of the other access points based on the additional relative location information,
map the actual locations on the floor of the other access points on the floor plan, and
provide, for display, the floor plan after mapping the actual locations on the floor of the other access points.

14. The device of claim 13, where the processor is further to:
determine coverage problems associated with the actual locations on the floor of the other access points, and
provide, based on the coverage problems, another recommendation to move one or more of the other access points.

15. The device of claim 11, where the processor is further to:
provide a recommendation to remove one or more of the other access points from the floor.

16. The device of claim 13, where the processor is further to:
use the actual location on the floor of the particular access point and the actual locations on the floor of the other access points to assign attenuation values to obstructions provided on the floor, and
provide information based on the attenuation values.

17. The device of claim 11, where the processor is further to:
receive client information from one or more client devices associated with the particular access point,
receive location information associated with one or more access points located on a different floor of the building, and
adjust information identifying the actual location on the floor of the particular access point based on at least one of the client information or the location information associated with the one or more access points located on the different floor.

18. The device of claim 11, where the relative location information includes omnidirectional range estimates that are based on strengths of radio frequency signals received from the other access points.

19. The device of claim 11, where the plurality of access points form a wireless local area network (WLAN).

20. A non-transitory computer-readable media storing instructions, the instructions comprising:
one or more instructions that, when executed by at least one processor, cause the at least one processor to:
determine distances between a particular access point, a plurality of access points located on a floor of a building, and other access points of the plurality of access points;
determine, based on the distances, relative location information associated with the particular access point,
the relative location information providing a location of the particular access point relative to the other access points;

determine, using a triangulation method or a trilateration method, an actual location on the floor of the particular access point based on the relative location information;

map the actual location on the floor of the particular access point on a floor plan of the floor;

provide, for display, the floor plan after mapping the actual location on the floor of the particular access point; and provide, for display and based on the actual location on the floor of the particular access point, to move the particular access point from the actual location on the floor to another location on the floor.

\* \* \* \* \*